R. HARPER.
Metal-Planing Machines.
No. 141,049. Patented July 22, 1873.
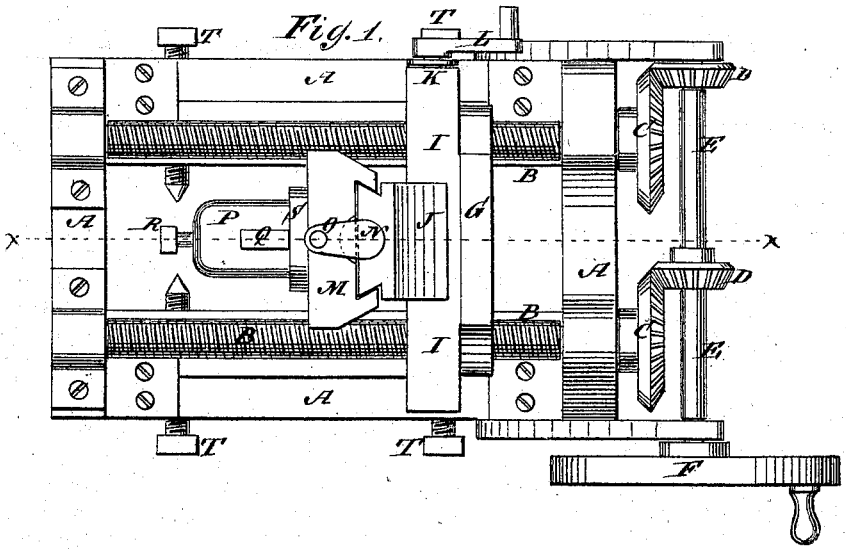
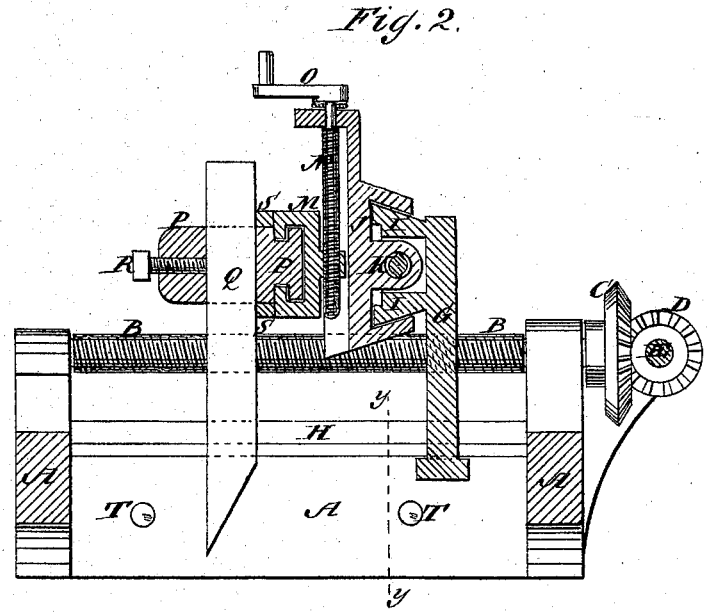
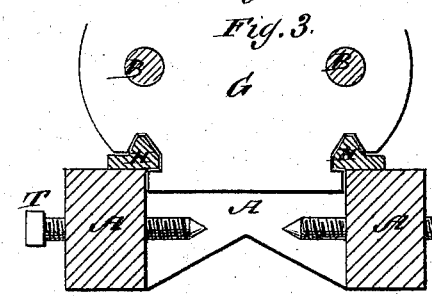
Witnesses:
E. Wolff
[signature]
Inventor:
R. Harper
Per [signature]
Attorneys.

UNITED STATES PATENT OFFICE.

ROBERT HARPER, OF GLENN MILLS, PENNSYLVANIA.

IMPROVEMENT IN METAL-PLANING MACHINES.

Specification forming part of Letters Patent No. 141,049, dated July 22, 1873; application filed May 24, 1873.

*To all whom it may concern:*

Be it known that I, ROBERT HARPER, of Glenn Mills, in the county of Delaware and State of Pennsylvania, have invented a new and useful Improvement in Hand-Planer and Key-Seat Cutter, of which the following is a specification:

Figure 1 is a top view of my improved machine. Fig. 2 is a vertical longitudinal section of the same taken through the line $x\ x$, Fig. 1. Fig. 3 is a detail vertical cross-section taken through the line $y\ y$, Fig. 2.

Similar letters of reference indicate corresponding parts.

My invention has for its object to furnish an improved machine for cutting key-seats in shafts without removing said shafts from their bearings, which may be used for dressing keys, and the fly-bars in the engine-rolls of paper-mills, and for other similar uses, and which shall be simple in construction, convenient in use, and effective in operation. The invention consists in the combination of the bed, the swiveled screws, the gear-wheels, or equivalent, the crank-shaft, and crank-wheel, the cross-head, the ways, the adjusting-blocks, the adjusting-screws, and the adjustable tool-holder with each other; and in the combination of the set-screw with the bed and with the operating parts of the machine, as hereinafter fully described.

A is the bed or frame of the machine, the end bars of which are notched upon the middle parts of their lower edges, as shown in Fig. 3, to receive the shaft and center itself upon it.

The bed A may be secured to the shaft by bolts passing through its side bars and through bars passing across the said shaft upon its other side; or it may be clamped to the said shaft in any other convenient way.

B are two screws, which are swiveled in bearings attached to the four corners of the bed A. To one end of the screws B are attached bevel-gear wheels C, into the teeth of which mesh the teeth of the bevel-gear wheels D, attached to the cross-shaft E, which revolves in bearings attached to the end of the bed A; and to one of its ends is attached the crank-wheel F, to which power is applied by hand, or by a belt, as may be most convenient. The screws B pass through screw-holes in the cross-head G, that slides upon ways H, attached to or formed upon the inner edges of the upper sides of the side bars of the bed A, as shown in Fig. 3, and which are so formed as to cause the said head to move back and forth squarely, and to sustain the upward pressure of the tool, thus relieving the screws B from any strain. To the cross-head G is attached, or upon it is formed, a block, I, the upper and lower sides of which are beveled to form a way for the block J. The forward side of the block I is grooved longitudinally to receive the nut formed upon the block J and the screw K, which is swiveled to the end of the block I, and which is operated by a crank, L, attached to its end. The side edges of the block J are beveled to serve as a way for the block M, and its forward side is grooved vertically to receive the nut formed upon the rear side of the block M and the screw N, which is swiveled to the end of the said block J, and which is operated by a crank, O, attached to its upper end. The forward side of the block M has a T-groove formed in it to receive the tool-holder P, through a slot in the forward end of which the shank of the tool Q is passed, and where it is secured by a set-screw, R, passing in through the forward end of said holder, the rear side of said shank resting against a washer, S, placed upon the holder P, and resting against the block M.

By this construction, the tool can be adjusted vertically and horizontally, and inclined to one or the other side, as may be required.

T are four set-screws, which pass in horizontally through the side bars of the bed A to receive and hold a key, bar, or other work to be planed or dressed.

Having thus described my invention, I claim as new and desire to secure by Letters Patent—

1. The combination of the bed A, swiveled screws B, gear-wheels C D, or equivalent, shaft E, crank-wheel F, cross-head G, ways H, adjusting-blocks I J M, adjusting-screws K N, and adjustable tool-holder P R, with each other, substantially as herein shown and described.

2. The combination of the set-screws T with the bed A, and with the operating parts of the machine, substantially as herein shown and described.

ROBERT HARPER.

Witnesses:
EDWARD W. MALIN,
P. B. CAVANAGH.